(12) United States Patent
Weber et al.

(10) Patent No.: US 6,653,391 B1
(45) Date of Patent: Nov. 25, 2003

(54) IMPACT-RESISTANT MODIFIED POLYESTERS AND POLYESTER/POLYCARBONATE BLENDS

(75) Inventors: Martin Weber, Maikammer (DE); Michael Fischer, Ludwigshafen (DE); Gerd Blinne, Bobenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,190

(22) PCT Filed: Nov. 6, 1998

(86) PCT No.: PCT/EP98/07112

§ 371 (c)(1), (2), (4) Date: May 11, 2000

(87) PCT Pub. No.: WO99/25770

PCT Pub. Date: May 27, 1999

(30) Foreign Application Priority Data

Nov. 14, 1997 (DE) .......................... 197 50 627

(51) Int. Cl.⁷ .......................... C08L 69/00; C08L 67/02
(52) U.S. Cl. .......................... 524/504; 525/64; 525/67
(58) Field of Search ....................... 525/64, 67; 524/504

(56) References Cited

U.S. PATENT DOCUMENTS

| | | | |
|---|---|---|---|
| 4,022,748 A | * 5/1977 | Schlichting et al. | |
| 4,652,607 A | 3/1987 | Stix et al. | ...................... 525/67 |
| 4,764,556 A | 8/1988 | Lausberg et al. | ............. 525/67 |
| 6,111,012 A | * 8/2000 | Fischer et al. | |

FOREIGN PATENT DOCUMENTS

| | | | |
|---|---|---|---|
| DE | 3302124 | | 7/1984 |
| DE | 3601423 | * | 7/1987 |
| DE | 3733839 | | 4/1989 |
| EP | 133993 | | 3/1985 |
| EP | 310976 | | 4/1989 |
| WO | 97/01588 | | 1/1997 |

OTHER PUBLICATIONS

Encyclopedia of Polymer Science Vol 12, pp. 225–226, Jun. 1989.*
Derwent Abstract of J58098357.

* cited by examiner

Primary Examiner—David J. Buttner
(74) Attorney, Agent, or Firm—Keil & Weinkauf

(57) ABSTRACT

The thermoplastic molding composition comprises, based on the total weight of components A, C and, if desired, B and D to G, which is 100% by weight in total,

- a: as component A, from 1 to 99% by weight of at least one polyester,
- b: as component B, from 0 to 98% by weight of at least one polycarbonate,
- c: from 1 to 80% by weight of a specific graft copolymer C,
- d: as component D, from 0 to 80% by weight of at least one styrene copolymer,
- e: as component E, from 0 to 30% by weight of at least one rubber,
- f: as component F, from 0 to 60% by weight of at least one fibrous or particulate filler, and
- g: as component G, from 0 to 20% by weight of other additives.

3 Claims, No Drawings

IMPACT-RESISTANT MODIFIED POLYESTERS AND POLYESTER/POLYCARBONATE BLENDS

The invention relates to impact-modified polyesters and polyester/polycarbonate blends.

Polymer mixtures are attracting increasing interest in industry because of the tailored combinations of properties which they offer. Of particular interest here are polymer mixtures made from incompatible polymers, which have unusual combinations of properties.

Polymer mixtures based on polyesters and polycarbonates have been known for a long time. The products which are important industrially also contain impact modifiers to improve their toughness, particularly at low temperatures, use being made in particular of butadiene-styrene-methyl methacrylate rubbers, butyl rubber, acrylate graft rubbers and ethylene copolymers with polar comonomers.

U.S. Pat. No. 4,764,556 describes thermoplastic molding compositions which contain a blend made from: two different polyesters, a polycarbonate and an elastomeric polymer with a glass transition temperature of less than −30° C. The rubber component used is an ethylene-n-butyl acrylate-acrylic acid copolymer or an ethylene-n-butyl acrylate-glycidyl methacrylate copolymer or a graft copolymer which has a shell of styrene-acrylonitrile or methyl methacrylate.

JP-A 5 83/098 357 has disclosed molding compositions which have polycarbonate, an aromatic polyester, a butyl rubber and an acrylic elastomer. The butyl rubber is preferably obtained from isobutene and isoprene.

The acrylic elastomer is preferably obtained by emulsion polymerization of alkyl acrylates, butadiene and methyl methacrylate.

DE-A 33 02 124 has disclosed thermoplastic molding compositions which comprise polycarbonates, polyalkenyl terephthalates, elastomeric graft polymers and terpolymers of acrylate, vinyl ester and unsaturated nitriles.

EP-B 0 133 993 has disclosed resin mixtures which encompass a polyester, a polycarbonate and a regulator combination. The regulator combination comprises a graft copolymer with an alkyl acrylate core and olefin copolymers which comprise alkyl acrylate, alkyl methacrylate, acrylic acid, methacrylic acid or mixtures of these.

Blends based on polyesters and styrene copolymers are likewise known.

EP-A-0 310 976 describes glass-fiber-reinforced thermoplastic molding compositions based on polyesters and graft polymers, and the preparation of these. The molding compositions comprise, besides polyesters and styrene-acrylonitrile copolymers, graft polymers based on acrylate rubbers. Mixtures of polyesters and at least 2 rubbers of different particle sizes are also known, from DE-A-37 33 839 and have good toughness.

In order to meet the ever-more-complex requirements placed upon polymer mixtures, there is a need for improved polymer mixtures based on polyesters and, if desired, polycarbonates and/or styrene copolymers and having good low-temperature impact strength and good dimensional stability and resistance to weathering.

It is an object of the present invention to provide thermoplastic molding compositions which comprise polyesters and, if desired, polycarbonates and/or styrene copolymers, which avoid the disadvantages of known molding compositions, and which in particular have good heat resistance, weathering resistance and dimensional stability. They should also have good notched impact strength.

We have found that this object is achieved by providing thermoplastic molding compositions comprising, based on the total weight of components A, C and, if desired, B and D to G, which is 100% by weight in total, a: as component A, from 1 to 99% by weight of at least one polyester, b: as component B, from 0 to 98% by weight of at least one polycarbonate, c: from 1 to 80% by weight of a graft copolymer C made from components C1, C2 and C3, the total weight of which is 100% by weight, c1: as component C1, from 1 to 95% by weight of a graft base made from a material with a glass transition temperature of at least 25° C. and with an average particle size of at least 50 nm, built up from components C11 to C14, the total weight of which is 100% by weight, c11: as component C11, from 50 to 99.9% by weight of at least one vinylaromatic monomer, c12: as component C12, from 0 to 49.9% by weight of at least one monomer copolymerizable with the monomers C11, c13: from 0.1 to 25% by weight of a crosslinking component C13 made from α) from 0.1 to 100% by weight of dihydrodicyclopenta dienyl acrylate β) from 0 to 99.9% by weight of at least one other crosslinking agent having two or more functional groups of differing re-activity and c14: from 0 to 25% by weight of at least one crosslinking agent C14 having two or more functional groups of the same reactivity.

c2: as component C2, from 4.9 to 98.9% by weight of a graft made from a material with a glass transition temperature of not more than 0° C., built up from components C21 to C23, the total weight of which is 100% by weight, c21: as component C21, from 50 to 100% by weight of at least one alkyl acrylate, c22: as component C22, from 0 to 50% by weight of at least one monomer copolymerizable with the monomers C21 and c23: from 0 to 20% by weight of at least one crosslinking agent C13 α and/or β or a mixture of these, and c3: as component C3, from 0.1 to 90% by weight of at least one other graft, d: as component D, from 0 to 80% by weight of at least one styrene copolymer, e: as component E, from 0 to 30% by weight of at least one rubber, f: as component F, from 0 to 60% by weight of at least one fibrous or particulate filler, and g: as component G, from 0 to 20% by weight of other additives.

It has been found that adding the specific graft copolymers of component C gives the molding compositions advantageous properties.

The novel molding compositions may be used for a wide variety of applications, for example for producing moldings for household items, automotive applications, electronic components and medical engineering equipment.

The individual components are described in more detail below.

Component A

The polyesters of component A are present in the thermoplastic molding compositions in amounts of from 1 to 99% by weight. If the molding compositions contain polycarbonate B, then component A is preferably present in amounts of from 15 to 80% by weight, particularly preferably from 20 to 70% by weight. If no polycarbonate of component B is present, then the proportion of component A is preferably from 25 to 88%, particularly preferably from 40 to 77% by weight.

The polyester is preferably derived from an aromatic dicarboxylic acid.

The aromatic ring of the dicarboxylic acid here may be further substituted, for example by halogen, such as chlorine or bromine, or $C_1$–$C_4$-alkyl, such as methyl, ethyl, isopropyl, n-propyl, n-butyl, isobutyl or tert-butyl. The aromatic dicarboxylic acids may be o-, m- or p-dicarboxylic acids or mixtures of these. They are preferably p-dicarboxylic acids. Preferred dicarboxylic acids are naphthalenedicarboxylic acid, terephthalic acid or isophthalic acid, or also mixtures of these. Up to 10 mol % of the aromatic dicarboxylic acids here may be replaced by aliphatic or cycloaliphatic dicarboxylic acids, such as adipic acid, azelaic acid, sebacic acid, dodecanedioic acids and cyclohexanedicarboxylic acids. It is also possible to use solely aliphatic dicarboxylic acids, but this is not preferred according to the invention.

Possible aliphatic dihydroxy compounds are in particular diols having from 2 to 6 carbon atoms, in particular 1,2-ethanediol, 1,4-butanediol, 1,6-hexanediol, 1,4-hexanediol, 1,4-cyclohexanediol, neopentyl glycol and mixtures of these. Examples of aromatic dihydroxy compounds which may be used are those based on diphenols of the formula I.

$$\text{HO—H}_4\text{C}_6\text{—A—C}_6\text{H}_4\text{—OH} \quad (I)$$

where A is a single bond, $C_1$–$C_3$-alkylene, $C_2$–$C_3$-alkylidene or $C_3$–$C_6$-cycloalkylidene, which may be substituted with up to 4 alkyl radicals, and in particular 2,2,4-trimethylolcyclohexylidene, or S or $SO_2$. Examples of preferred biphenols of the formula I are 4,4'-dihydroxybiphenyl, 2,2-bis (4-hydroxyphenyl)propane, 2,4-bis(4-hydroxyphenyl)-2-methylbutane, 1,1-bis(4-hydroxyphenyl)cyclohexane and bisphenol TMC. Particular preference is given to 2,2-bis(4-hydroxyphenyl)propane and 1,1-bis(4-hydroxyphenyl)cyclohexane.

Particularly preferred polyesters are polyalkylene terephthalates which are derived from alkanediols having from 2 to 6 carbon atoms. Particular preference is given to polyethylene terephthalate and polybutylene terephthalate.

The relative viscosity of the polyesters A is generally from 1.2 to 1.8, measured as 0.5% strength by weight solution in a mixture of phenol and o-dichlorobenzene (weight ratio 1:1) at 25° C.

Component B

As component B, the novel thermoplastic molding compositions may contain at least one polycarbonate in amounts of from 0 to 98% by weight, preferably from 15 to 80% by weight, in particular from 19.5 to 69.5% by weight. However, the thermoplastic molding compositions may also be free from polycarbonates. The polycarbonate here is preferably an aromatic polycarbonate. The polycarbonate is moreover preferably halogen-free. Examples of suitable halogen-free polycarbonates are those based on biphenols of the above formula I. Both homopolycarbonates and copolycarbonates are suitable as component B, preference being given to the copolycarbonates of bisphenol A as well as to bisphenol A homopolymer, particular preference being given to copolycarbonates based on bisphenol A and bisphenol TMC. Other preferred examples of suitable biphenols are hydroquinone and resorcinol.

Other suitable biphenols are described in H. Schnell, Chemistry and Physics of Polycarbonates, Interscience Publishers, 1964, and also in US 2,999,835 and DE-A 22 48 817. Processes for preparing polycarbonates are described, for example, in U.S. Pat. No. 2,999,835, DE-A 22 48 817, DE-A 13 00 266 and DE-A 14 95 730.

The polycarbonates which are suitable may be branched in a known manner, preferably by incorporating from 0.05 to 2.0 mol %, based on the total of the biphenols used, of at least trifunctional compounds, for example those having 3 or more phenolic OH groups.

Particularly suitable polycarbonates have proven to be those which have relative viscosities of from 1.10 to 1.50, in particular from 1.25 to 1.40. This corresponds to average molecular weights $M_w$ (weight average) of from 10,000 to 200,000, preferably from 20,000 to 80,000.

The polycarbonates may be prepared, for example, by reacting the biphenols with phosgene in the interfacial process or with phosgene in the homogeneous-phase process (known as the pyridine process), the targeted molecular weight in each case being achieved in a known manner by means of an appropriate amount of known chain terminators. Polydiorganosiloxane-containing polycarbonates are described, for example, in DE-A 33 34 782. Examples of suitable chain terminators. are phenol, p-tert-butylphenol, or else long-chain alkylphenols, such as 4-(1,3-tetramethylbutyl)-phenol in accordance with DE-A 28 42 005 or monoalkylphenols or dialkylphenols having a total of from 8 to 20 carbon atoms in the alkyl substituents in accordance with DE-A 35 06 472, such as p-nonylphenyl, 3,5-di-tert-butylphenol, p-tert-octylphenol, p-dodecylphenyl, 2-(3,5-dimethylheptyl)phenol and 4-(3,5-dimethylheptyl)phenol.

For the purposes of the present invention, halogen-free polycarbonates are polycarbonates built up from halogen-free biphenols, halogen-free chain terminators and, if desired, halogen-free branching agents, the content of subordinate ppm amounts of hydrolyzable chlorine resulting, for example, from the preparation of the polycarbonates using phosgene in the interfacial process not meriting the description for the purposes of the invention. Such polycarbonates with ppm contents of hydrolyzable chlorine are halogen-free polycarbonates for the purposes of the present invention.

Component C

The graft copolymers of component C are present in the thermoplastic molding compositions in amounts from 1 to 80% by weight. In molding compositions which contain no polycarbonate of component B, they are preferably present in amounts of from 2 to 40% by weight, particularly preferably from 3 to 30% by weight. If a polycarbonate of component B is present, then they are preferably present in amounts of from 5 to 50% by weight, particularly preferably from 10 to 15% by weight.

Suitable graft copolymers C are described, for example, in WO 97/01588, or are built up as follows:

The graft base C1 is composed of a material which has a glass transition temperature of at least 25° C., preferably at least 50° C., in particular from 80 to 130° C.

The graft base C1 is built up from 50 to 99.8% by weight, preferably from 60 to 99% by weight, particularly preferably from 60 to 98% by weight, based on components C11 to C14, of at least vinylaromatic monomer C11. Examples of vinylaromatic monomers are styrene, α-methylstyrene and ring-alkylated styrenes, such as p-methylstyrene and p-tert-butylstyrene. Particular preference is given to styrene, α-methylstyrene and p-methylstyrene and mixtures of these. Styrene is very particularly preferred.

Component C1 may also contain, besides the monomers C11, monomers C12 which are copolymerizable therewith. Examples which may be mentioned of monomers of this type are acrylonitrile, methacrylonitrile, acrylic acid, methacrylic acid, methyl methacrylate, glycidyl methacrylate, maleic anhydride and vinylmethyl ether.

It is, of course, also possible to use mixtures of different monomers C12. Preferred monomers C12 include acrylonitrile and methyl methacrylate. According to the invention, the proportion of monomers C12 is from 0 to 49.8% by weight, preferably from 0 to 39% by weight, in particular from 0 to 38% by weight, based on components C12 to C14.

The graft base is moreover built up using a crosslinking component C13, the proportion of which is from 0.1 to 25% by weight, preferably from 0.5 to 10% by weight, particularly preferably from 1 to 5% by weight, based on components C11 to C14, The crosslinking component may comprise dihydrodicyclopentadienyl acrylate (α) alone or in combination with at least one other crosslinking agent having two or more functional groups of differing reactivity (β). According to the invention, the crosslinking component is composed of from 0.1 to 100% by weight, preferably from 25 to 100% by weight, based on α and β, of α and from 0 to 99.9% by weight, preferably from 0 to 75% by weight, based on α and β, of β. The crosslinking component particularly preferably comprises from 50 to 100% by weight of α and from 0 to 50% by weight of β.

Examples of suitable crosslinking agents β are ethylenically unsaturated monomers which carry epoxy, hydroxyl, carboxyl, amino or anhydride groups, including hydroxyalkyl acrylates and hydroxyalkyl methacrylates, such as hydroxy-$C_1$-$C_{10}$-alkyl acrylates and hydroxy-$C_1$-$C_{10}$-alkyl methacrylates, in particular hydroxyethyl acrylate and hydroxy-n-propyl acrylate. Other possible compounds are allyl methacrylate, methallyl methacrylate, acryloylalkoxysilanes and methacryloylalkoxysilanes of the formula III

$$H_2=CR^2-C-O-(CH_2)_p-SiR^1O_{(3-n)2} \quad (III)$$

where $R^1$ is $C_1$-$C_3$-alkyl or phenyl, preferably methyl, $R^2$ is hydrogen or methyl, n is an integer from 0 to 2 and p is an integer from 1 to 6, preferably from 1 to 4.

According to the invention, the graft base C may also contain from 0 to 25% by weight, preferably from 0.1 to 10% by weight, based on components C11 to C14, of at least one crosslinking agent C14 having two or more functional groups of the same reactivity, in amounts of from 1 to 5% by weight, based on components C11 to C14. In principle, there may be any ratio between components C13 and C14. However, preferred graft bases C contain components C13 and C14 in a ratio of from 1:0.75 to 1:5, The portion of component C14 may, however, also be less than this, for example as far as a ratio of 1:0.5. Higher proportions of C14 are also possible, and the ratios of C13 to C14 may be up to 1:10, The ratios of C13 to C14 are particularly preferably from 1:0.8 to 1:3, or 1:1 to 1:3, in particular from 1:0.9 to 1:2, for example 1:1 or 1:1.5.

Examples of suitable crosslinking agents C14 are mono-, di-, tri- and tetraalkylene glycol acrylates, preferably $C_1$-$C_4$-monoalkylene glycol diacrylates, such as ethylene glycol diacrylate, n-propylene glycol diacrylate, n-butylene 1,3-glycol diacrylate and n-butylene 1,4-glycol diacrylate. Use of mono-, di-, tri- or tetraalkylene glycol dimethacrylates is also possible, preferably of $C_1$-$C_4$-monoalkylene glycol dimethacrylates, such as ethylene glycol dimethacrylate, n-propylene glycol dimethacrylate, n-butylene 1,3-glycol dimethacrylate or n-butylene 1,4-glycol dimethacrylate. Acrylates or methacrylates of glycerol, trimethylolpropane, pentaerythritol, inositol or other sugar alcohols are also suitable crosslinking agents C14. Other suitable crosslinking agents C14 which should be mentioned are acryl-and methacrylamides of ethylenediamine or of other aliphatic di- or polyamines. The crosslinking agents C14 used may also be diallyl maleate, diallylfumarate or diallyl phthalate, triacryl- or trimethacrylaamides, triallyl cyanurate or triallyl isocyanurate, or also vinylbenzenes, such as divinylbenzene or trivinylbenzene.

The selection of the crosslinking agent C14 depends on the type of network which the graft base A is to have. A compact network results if, for example, crosslinking agent α is used together with divinylbenzene, whereas a relatively loose network is obtained if, for example, crosslinking agent α is used together with tetraethylene glycol diacrylate or dimethacrylate. Particularly preferred mixtures of crosslinking agents include dihydrodicyclopentadienyl acrylate and butanediol diacrylate; dihydrodicyclopentadienyl acrylate and divinylbenzene; dihydrodicyclopentadienyl acrylate and diethylene glycol diacrylate, and also dihydrodicyclopentadienyl acrylate and tetraethylene glycol dimethacrylate.

Preference is also given to dihydrodicyclopentadienyl acrylate, butanediol diacrylate and allylmethacrylate; dihydrodicyclopentadienyl acrylate, butanediol diacrylate and hydroxyethyl acrylate; dihydrodicyclopentadienyl acrylate, butanediol diacrylate and divinylbenzene; dihydrodicyclopentadienyl acrylate, hydroxyethyl acrylate and divinylbenzene or diethylene glycol diacrylate or tetraethylene glycol dimethacrylate; dihydrodicyclopentadienyl acrylate, hydroxyethyl acrylate, allyl methacrylate and divinylbenzene or diethylene glycol diacrylate or tetraethylene glycol dimethacrylate; dihydrodicyclopentadienyl acrylate, allyl methacrylate, β-methacryloyloxyethyldimethoxymethylsilane and divinylbenzene or diethylene glycol diacrylate or tetraethylene glycol dimethacrylate; dihydrodicyclopentadienyl acrylate, β-methacryloyloxyethyldimethoxymethylsilane and divinylbenzene or diethylene glycol diacrylate or tetraethylene glycol dimethacrylate.

The graft base C1 generally has a particle size ($d_{50}$) of 50 nm or greater, for example 80 nm or greater. Particle sizes ($d_{50}$) of 1000 nm are generally not exceeded. The graft bases according to the invention may, however, also have larger particle sizes ($d_{50}$), for example up to 1200 nm. The graft base C1 particularly preferably has a particle size ($d_{50}$) in the range from 50 to 800 nm, in particular from 200 to 500 nm, for example from 250 to 400 nm. The values given for the average particle size are in all cases the weight average of the particle size, as determined using an analytical ultracentrifuge and the method of W. Scholtan and H. Lange, Kolloid-Z. and Z.-Polymere 250 (1972), pages 782 to 796, The ultracentrifuge measurement gives the integral mass distribution of the particle diameter of a specimen. From this it is possible to deduce what percentage by weight of the particles have a diameter identical to or smaller than a particular size. The average particle diameter, also termed the $d_{50}$ of the integral mass distribution, is defined here as the particle diameter at which 50% by weight of the particles have a smaller diameter than that corresponding to the $d_{50}$. 50% by weight of the particles then likewise have a larger diameter than the $d_{50}$.

The graft base C1 generally has a gel content of at least 90%, preferably at least 95%, the gel content being defined as the ratio of the weight insoluble in the solvent (toluene) to the total weight. The swelling index is the ratio of the weight swollen in the solvent (toluene) to the unswollen weight. For the graft base, it is generally from 7 to 15.

The graft base C1 is preferably built up from styrene and dihydrodicylopentadienyl acrylate. Preference is given to a weight ratio of from 95 to 99% by weight of styrene and from 1 to 5% by weight of dihydrodicyclopentadienyl acrylate (DCPA). A proportion of 2% by weight of DCPA is particularly preferred.

The graft C2 is preferably made from at least one $C_1$–$C_8$-alkyl (meth)acrylate and DCPA, in particular from n-butyl acrylate and DCPA. The proportion of DCPA here is from 1 to 5% by weight, in particular about 2% by weight.

It is preferable for at least the outermost of the other grafts C3 to be built up from styrene and acrylonitrile. The proportion of acrylonitrile here is preferably from 10 to 40% by weight, in particular about 25% by weight.

Component D

The novel thermoplastic molding compositions contain component D in amounts of from 0 to 80% by weight. In the case of molding compositions with component B, the proportion is preferably from 0 to 20% by weight, particularly preferably from 0 to 15% by weight. In the case of molding compositions without component B, the proportion is preferably from 5 to 50% by weight, particularly preferably from 10 to 30% by weight.

Component D is a halogen-free, thermoplastic copolymer made from $d_1$) as component D1, from 50 to 95% by weight, preferably from 60 to 80% by weight, of styrene or of substituted styrenes of the formula $C_6H_5(R')C=CH_2$, where $R'=C_1$–$C_8$-alkyl, where the phenyl radical may carry from 1 to 3 $C_1$–$C_8$-alkyl radicals as substituents, or methyl methacrylate or mixtures of these, $d_2$) as component D2, from 5 to 50% by weight, preferably from 20 to 40% by weight, of acrylonitrile, methacrylonitrile, methyl methacrylate, maleic anhydride or mixtures of these.

The copolymers D are resin-like, thermoplastic and rubber-free. Particularly preferred copolymers D) are those made from styrene with acrylonitrile and, if desired, with methyl methacrylate, made from α-methylstyrene with acrylonitrile and, if desired, with methyl methacrylate, or made from styrene and α-methylstyrene with acrylonitrile and, if desired, with methyl methacrylate, and made from styrene and maleic anhydride. It is also possible to use simultaneously more than one of the copolymers described.

The copolymers D) are known per se and may be prepared by free-radical polymerization, in particular by emulsion, suspension, solution or bulk polymerization. They have viscosity numbers in the range from 40 to 160, and this corresponds to average molecular weights Mw (weight average) of from 40,000 to 2,000,000.

Component D is particularly preferably built up from styrene and acrylonitrile. The proportion of acrylonitrile here is preferably from 20 to 40% by weight, particularly preferably from 18 to 35% by weight.

Component E

The novel thermoplastic molding compositions contain component E in amounts of from 0 to 30% by weight, preferably from 0 to 20% by weight, particularly preferably from 0 to 10% by weight. Component E is preferably at least one ethylene copolymer which has, in particular, carboxyl groups.

The ethylene copolymer of component E is preferably a copolymer of components E1 to E4, the total weight of which is 100% by weight:

e1: as component E1, from 50 to 98.9% by weight, preferably from 60 to 97.8% by weight of ethylene, e2: as component E2, from 1 to 49.9% by weight, preferably from 2 to 39.8% by weight, of at least one $C_1$–$C_8$-alkyl acrylate, e3: as component E3, from 0.1 to 20% by weight, preferably from 0.2 to 15% by weight, of at least one α,β-unsaturated carboxylic acid or of a derivative of these, e4: as component E4, from 0 to 10% by weight, preferably from 0 to 5% by weight, of other copolymerizable monomers.

Suitable polymers of this type are described, for example, in DE-A 42 27 742.

The $C_1$–$C_8$-alkyl acrylate preferably used is n-butyl acrylate and/or ethylhexyl acrylate, specifically n-butyl acrylate.

Examples of suitable α,β-unsaturated carboxylic acids are acrylic acid, methacrylic acid, ethacrylic acid, maleic acid and fumaric acid. These may also be used in the form of their esters, anhydrides, acid halides or amides. Preference is given to the use of acrylic acid or methacrylic acid. Examples of other copolymerizable monomers are polar comonomers. such as aliphatic vinyl monomers containing nitrile groups and halogen atoms.

Possible other copolymerizable monomers are $C_3$–$C_8$-alk-1-enes, such as propene, 1-butene, 1-pentene and 1-hexene.

A preferred ethylene copolymer comprises, besides ethene, only n-butyl acrylate and acrylic acid, the proportions being preferably from 25 to 45% by weight of n-butyl acrylate and from 2 to 10% by weight of acrylic acid. The ethylene copolymer preferably has a melt flow index of 10 ml/10 min at 190° C. under a load of 2.16 kg.

The ethylene copolymers may be prepared by conventional high-pressure polymerization processes, as described, for example, in Ullmann's Enzyklopädie der Technischen Chemie, 4th edition, Vol. 19,Verlag Chemie, Weinheim, (1980), pages 169 to 175,The copolymerization of the ethene here preferably takes place at pressures of from 350 to 5000 bar, more preferably from 1500 to 3000 bar, usually at from 50 to 450° C., preferably from 150 to 350° C. Reference may also be made to EP-A0 131 707.

Component F

The novel thermoplastic molding compositions contain component F in amounts of from 0 to 60% by weight. If component B is present, then the proportion is preferably from 0 to 35% by weight, particularly preferably from 0 to 20% by weight. If no component B is present, then the proportion is preferably from 5 to 50% by weight, particularly preferably from 10 to 45% by weight.

Fibrous and particulate fillers are preferably carbon fibers, or in particular glass fibers. The glass fibers used may be of E, A or C glass, and are preferably provided with a size and a coupling agent. Their diameter is generally from 6 to 20 μm. It is possible to use either continuous fibers (rovings) or chopped glass fibers of from 1 to 10 mm length, preferably from 3 to 6 mm. It is also possible to add fillers or reinforcing materials, such as glass beads, mineral fibers, whiskers, alumina fibers, mica, kaolin, talc, powdered quartz and wollastonite. Use may also be made of metal flakes (such as metal flakes from Transmed Corp.), metal powders, metal fibers, metal-coated fillers (such as nickel-coated glass fibers), and also other additives which have a screening effect against electromagnetic radiation. Al flakes (K 102 from Transmed) may in particular be used for EMI (electromagnetic interference) purposes. The molding compositions may also be blended with additional carbon fibers, conductivity black or nickel-coated carbon fibers.

A general description of suitable fibrous and particulate fillers can be found in Gächter/Müller, Kunststoff-Additive, 3rd edition, Hansa-Verlag, 1990.

Component G

The novel thermoplastic molding compositions contain component G in amounts from 0 to 20% by weight, preferably from 0 to 10% by weight. If component B is present, then the proportion is particularly preferably from 0.5 to 2% by weight. If no component B is present, then the proportion is particularly preferably from 0 to 5% by weight.

Other additives which may be used are those generally employed in poly-ester/polycarbonate blends. These may, for example, be processing aids and stabilizers, such as UV stabilizers, lubricants, phosphorus stabilizers and antistats. Other additives are dyes, pigments and antioxidants. Stabilizers may serve to improve thermal stability, increase stability to light or raise hydrolysis resistance and chemical resistance. Lubricants are useful in particular when producing moldings.

Suitable stabilizers are the usual sterically hindered phenols, or else vitamin E and/or compounds of similar structure. Other suitable stabilizers are HALS stabilizers, benzophenones, resorcinols, salicylates, benzotriazoles and other compounds (for example IRGANOX®, TINUVIN®, such as TINUVIN® 770 HALS absorber (bis-2,2,6,6-tetramethyl-4-piperidyl sebacate) and TINUVIN® P (UV absorber, (2H-benzotriazol-2-yl)-4-methylphenol), and TOPANOL®).

Suitable lubricants and mold-release agents are stearic acids and stearyl alcohol, stearates, and/or higher fatty acids in general, and derivatives of these and appropriate mixtures of fatty acids having from 12 to 30 carbon atoms.

Other possible additives are silicone oils, oligomeric isobutylene and similar substances. It is likewise possible to use pigments, dyes, optical brighteners, such as ultramarine blue, phthalocyanines, titanium dioxide, cadmium sulfides, and derivatives of perylenetetracarboxylic acid.

Other compounds which may be used as component G are transesterification stabilizers, such as Irgaphos® P-EPQ (tetrakis(2,4-di-tert-butylphenyl) 4,4'-diphenylenediphosphonite) from Ciba-Geigy, or phosphates, such as zinc phosphate. Preferred antioxidants are phenolic antioxidants. Preferred UV stabilizers are triazoles.

Preparation of the Molding Compositions

The novel molding compositions are prepared by mixing components A and C and, if desired, B and D to G. The sequence of mixing the components may be as desired.

The novel molding compositions may be prepared by processes known per se, for example extrusion. They may, for example, be prepared by mixing the starting components in conventional mixing apparatus, such as screw extruders, preferably twin-screw extruders, Brabender mixers, Banbury mixers, or also kneaders, followed by extrusion. The extrudate is cooled and comminuted after extrusion. The sequence of mixing the components may be varied, and it is possible, for example, to premix two or, if desired, three components, or else to mix all of the components together.

To obtain very homogeneous mixing, intensive and thorough mixing is advantageous. The average mixing times required for this are generally from 0.2 to 30 minutes at from 230 to 280° C., preferably from 230 to 260° C. The extrudate is generally cooled and comminuted after extrusion. The novel molding compositions have a good balance of notched impact strength, fracture energy, stability during processing and weathering resistance. The properties mentioned, and high heat resistance, make the compositions suitable for producing moldings which may be used, for example, in the household, electrical, motor vehicle and medical engineering sectors.

The novel thermoplastic molding compositions may be processed by the known methods of thermoplastics processing, for example by extrusion, injection molding, calendaring, blow molding, compression molding or sintering.

The invention is explained below using Examples.

EXAMPLES

Component A

Polybutylene terephthalate having a viscosity number of 130 ml/g (measured in 0.5% strength solution in phenol and o-dichlorobenzene.

Component B

Polycarbonate based on bisphenol A and having a viscosity number of 61.2 ml/g (measured in 0.5% strength by weight $CH_2Cl_2$ solution at 23° C.).

Preparation of the Graft Polymer 1C a) Preparation of the Polystyrene Core 5000 g of water, 5 g of the sodium salt of a $C_{12}$–$C_{18}$ paraffinsulfonic acid, 3 g of potassium peroxodisulfate, 3 g of sodium hydrogencarbonate and 1 g of sodium pyrophosphate were heated to 70° C., with stirring and under nitrogen. A mixture of 720 g of styrene and 14 g of dihydrodicyclopentadienyl acrylate (DCPA) was added within a period of 3 hours. After monomer addition had ended, the emulsion was held for a further 2 hours at 65° C. The resultant. polystyrene seed latex has an average particle diameter $d_{50}$ of 90 nm. The solids content of the polystyrene seed latex emulsion was 12.5%.

b) Preparation of the Polybutylene Acrylate Shell 5750 g of the base were mixed with a further 250 g of water, and 9 g of potassium peroxodisulfate were added, together with 10 g of sodium hydrogencarbonate and 1 g of sodium phosphate. 2850 g of butyl acrylate and 59 g of DCPA were added, with stirring, at 65° C. within a period of 3 hours. Stirring was then continued for 2 hours at the same temperature. The polystyrene core had an average particle diameter of 150 nm (solids content=39.7%).

c) Preparation of the Graft Shell 4280 g of the dispersion obtained in this way were mixed with 5 g of potassium peroxodisulfate and 6 g of the sodium salt of a $C_{12}$–$C_{18}$ paraffinsulfonic acid, and also a further 2700 g of water. The following were then added with stirring: firstly 380 g of styrene within a period of 1 hour (stirring continued for 1 hour), then 570 g of styrene and 190 g of acrylonitrile within a period of 2 hours. This gave particles with a mean diameter of 180 nm. The solids content of the dispersion was 35%.

Preparation of the Graft Polymer 2C a) Preparation of the Polystyrene Core 700 g of water, 3.4 g of the sodium salt of a $C_{12}$–$C_{18}$ paraffinsulfonic acid, 1.75 g of potassium peroxodisulfate, 2.5 g of sodium hydrogencarbonate, 1 g of sodium pyrophosphate and 50 g of a polystyrene seed latex (solids content=38.7%, $d_{50}$=85 nm) were heated to 70° C. A mixture of 550 g of styrene, 11.5 g of DCPA and 10 g of divinylbenzene was then added within a period of 2 hours. After monomer addition had finished, the emulsion was held for a further hour at 65° C.

The polystyrene core had an average particle diameter $d_{50}$ of 250 nm. The emulsion had a solids content of 38.5%.

b) Preparation of the Polybutyl Acrylate Shell

To the emulsion obtained were added 10 g of the sodium salt of a $C_{12}$–$C_{18}$ paraffinsulfonic acid, 6.5 g of potassium peroxodisulfate, 5 g of sodium hydrogencarbonate and 2 g of sodium pyrophosphate, and also 2490 g of water. 1730 g of butyl acrylate and 35 g of DCPA were added at 65° C. within a period of 3.5 hours, followed by stirring for a further 2 hours at 65° C. ($d_{50}$=420 nm, solids content= 38.6%).

c) Preparation of the PolystyTene-acrylonitrile Graft Shell 6070 g of the emulsion obtained in this way were diluted with 2600 g of water, and 5 g of the sodium salt of a $C_{12}$–$C_{18}$ paraffinsulfonic acid and 4.5 g of potassium peroxodisulfate were added. A mixture of 790 g of styrene and 260 g of acrylonitrile was added dropwise at 65° C. within a period of 2 hours, and a stirring was continued at 65° C. for a further 2 hours. ($d_{50}$=500 nm, solids content=34.8%).

The graft polymers C1 and C2 were precipitated from the emulsion using calcium chloride solution at 95° C., washed with water and dried in a stream of hot air.

The Following Were Used for Comparative Experiments:

3C: An ASA Graft Rubber Prepared as Follows:

a) Preparation of the Latex 16 g of butyl acrylate and 0.4 g of tricyclodecenyl acrylate were heated to 60° C. in 150 g of water, with stirring, with addition of 1 g of the sodium salt of a $C_{12}$–$C_{18}$ paraffinsulfonic acid, 0.3 g of potassiurn persulfate, 0.3 g of sodium hydrogencarbonate and 0.15 g of sodium pyrophosphate. Beginning 10 minutes after the polymerization reaction had begun, a mixture of 82 g of butyl acrylate and 1.6 g of tricyclodecenyl acrylate were added within a period of 3 hours. After monomer addition had finished, stirring was continued for a further hour. The resultant latex of the crosslinked butyl acrylate polymer had a solids content of 40% by weight, and its average particle size (weight average) was determnined as 76 nm; the particle size distribution was narrow (quotient Q=0.29).

c) Preparation of the Graft Shell 150 g of the polybutyl acrylate latex obtained in a) were mixed with 40 g of a mixture of styrene and acrylonitrile (weight ratio 75:25) and 60 g of water, and heated at 65° C. for 4 hours, with stirring, after adding a further 0.03 of potassium persulfate and 0.05 g of lauroyl peroxide. After the graft copolymerization had finished, the polymerization product was precipitated from the dispersion using calcium chloride solution at 95° C., washed with water and dried in a stream of hot air. The degree of grafting of the graft copolymer was 35%, and the particle size 91 nm.

4C: An ASA Graft Rubber Prepared as Follows:

a) Preparation of the Latex 50 g of water and 0.1 g of potassium persulfate were added to 1.5 g of the latex prepared as in 3C a), and then the following were added during the course of 3 hours at 60° C.: on the one hand a mixture of 49 g of butyl acrylate and 1 g of tricyclodecenyl acry late, and on the other hand a solution of 0.5 g of the sodium salt of a $C_{12}$–$C_{18}$ paraffinsulfonic acid in 25 g of water. Polymerization was then continued for 2 hours. A resultant latex of the crosslinked butyl acrylate polymer had a solids content of 40%. The average particle size (weight average) of the latex was determined as 430 nm, and the particle size distribution was narrow (Q=0.1).

c) 150 g of the latex prepared as in a) were mixed with 20 g of styrene and 60 g of water and heated for 3 hours at 65° C. after adding a further 0.03 g of potassium persulfate and 0.05 g of lauroyl peroxide. The dispersion obtained in this graft copolymerization was then polymerized with 20 g of a mixture of styrene and acrylonitrile in a weight ratio of 75:25 for a further 4 hours. The reaction product was then precipitated from the dispersion using a calcium chloride solution at 95° C., washed with water and dried in a stream of hot air. The degree of grafting of the graft copolymer was determined as 35%; the average particle size of the latex particles was 510 nm.

5C: Methacrylate-butadiene-styrene-graft rubber with three-shell structure (polybutadiene core, polystyrene shell, PMMA shell) with 15.6% by weight of methyl methacrylate, 16.7% by weight of styrene and 67.7% by weight of butadiene.

Component D

A copolymer made from 81% by weight of styrene and 19% by weight of acrylonitrile, with a viscosity number of 72 ml/g, measured in a 0.5% strength by weight solution in dimethylformamide at 23° C.

Component F1

Talc with the following particle size parameters: $X_{10}$=1.7 μm, $X_{90}$=10.82 μm.

Component F2

Glass fiber provided with an epoxy size.

Component G

Tetrakis (2,4-di-tert-butylphenyl) 4,4'-diphenylenediphosphonite. (transesterification stabilizer).

Preparation and Testing of the Molding Compositions

A twin-screw extruder was used to mix the components. The melt was passed through a waterbath and granulated.

The mechanical properties of the specimens prepared using the extruder were also determined.

Heat resistance was determined by means of HDT B. Notched impact strength of the products was determined on ISO specimens in accordance with ISO 179 1eA. The fracture energy of the molding compositions was determined in accordance with DIN 53 433 at −30° C.

Weathering resistance was determined by subjecting disks or ISO specimens for 500 hours to a xenon test in accordance with DIN 53387, method AX (Atlas Xenotest 1200 CPS). The fracture energy was then determined at −30° C.

Dimensional stability was assessed using the coefficient of linear expansion, determined in accordance with DIN 53 752, method A, on 2 specimens (10×10×4) in each case. The values given (CTE) are measured in a longitudinal direction at 25° C.

Further parameters used to describe a reinforced molding composition were the impact strength in accordance with ISO 179 1eU, and also the ultimate tensile strength (determined in accordance with ISO 527).

The mixes for the molding compositions, and the results of the tests, are listed in Table 1 (polyester/polycarbonate blends, in some cases with styrene-acrylonitrile copolymer) and Table 2 (polyester/poly(styrene-acrylonitrile) blends).

TABLE 1

| Molding composition No. | 1 comp | 2 comp | 3 comp | 1 | 2 | 3 | 4 comp | 4 |
|---|---|---|---|---|---|---|---|---|
| Component [% by weight] | | | | | | | | |
| A | 39 | 39 | 39 | 39 | 39 | 39 | 37 | 37 |
| B | 50 | 50 | 50 | 50 | 50 | 50 | 47 | 47 |
| 1C | — | — | — | 7 | — | 3.5 | — | 5 |
| 2C | — | — | — | — | 7 | 3.5 | — | 5 |
| 3C | 7 | — | — | — | — | — | — | — |
| 4C | — | 7 | — | — | — | — | — | — |
| 5C | — | — | 7 | — | — | — | 10 | — |
| D | 3 | 3 | 3 | 3 | 3 | 3 | — | — |
| F1 | — | — | — | — | — | — | 5 | 5 |
| G | 1 | 1 | 1 | 1 | 1 | 1 | 1 | 1 |
| HDT B [° C.] | 99 | 100 | 96 | 100 | 101 | 101 | 101 | 104 |
| $a_k$ [kJ/m$^2$] | 17 | 21 | 51 | 27 | 32 | 37 | 11 | 9 |
| $W_{s,-30° C.}$ [Nm] | 59 | 53 | 84 | 64 | 63 | 67 | 64 | 56 |
| $W_{s,-30° C.}$ [Nm] after 500 h | 41 | 42 | 7 | 49 | 47 | 50 | 3 | 43 |
| CTE [10$^{-6}$K$^{-1}$] | 89 | 90 | 93 | 84 | 83 | 83 | 79 | 72 |

1 comp–4 comp: comparative experiments

The experiments confirm the excellent property profile of the novel thermoplastic molding compositions, and particular emphasis should be given to their improved dimensional stability and very good UV stability.

TABLE 2

| | Molding composition No. | | | | | |
|---|---|---|---|---|---|---|
| | 5comp | 6comp | 7comp | 5 | 6 | 7 |
| Component [% by weight] | | | | | | |
| A | 56 | 56 | 56 | 56 | 56 | 56 |
| 1C | — | — | — | 12 | — | 6 |
| 2C | — | — | — | — | 12 | 6 |
| 3C | 12 | — | — | — | — | — |
| 4C | — | 12 | — | — | — | — |
| 5C | — | — | 12 | — | — | — |
| D | 12 | 12 | 12 | 12 | 12 | 12 |
| F2 | 20 | 20 | 20 | 20 | 20 | 20 |
| HDT B [° C.] | 205 | 204 | 205 | 208 | 207 | 208 |
| $a_n$ [kJ/m$^2$] | 48 | 47 | 46 | 53 | 54 | 55 |
| $a_n$ [kJ/m$^2$] after 500 h | 41 | 40 | 32 | 46 | 47 | 46 |
| CTE [10$^{-6}$ K$^{-1}$] | 43 | 43 | 47 | 39 | 38 | 39 |
| $\delta_R$ [N/mm$^2$] | 104 | 103 | 99 | 109 | 110 | 112 |

5comp–7comp: comparative experiments

As the result of the experiment confirm, the novel thermoplastic molding composition have improved toughness and dimensional stability, combined with good weathering resistance.

We claim:

1. A thermoplastic molding composition, based on the total weight of components A, C and, optionally, B and D to G, which is 100% by weight in total,
   a: as component A, from 1 to 99% by weight of at least one polyester having a relative viscosity of from 1.2 to 1.8,
   b: as component B, from 0 to 98% by weight of at least one polycarbonate having a relative viscosity of from 1.1 to 1.5,
   c: from 1 to 80% by weight of a graft copolymer C made from components C1, C2 and C3, the total weight of which is 100% by weight,
      C1: as component C1, from 1 to 95% by weight of a graft base made from a material with a glass transition temperature of at least 25° C. and with an average particle size of at least 50 nm and a gel content of at least 90%, built up from components, the total weight of which is 100% by weight, said components being 75 to 99.9% by weight of styrene and from 0.1 to 25% by weight of a crosslinking component made from 0.1 to 100% by weight of dihydrodicyclopentadienyl acrylate and from 0 to 25% by weight of divinylbenzene,
      C2: as component C2, from 4.9 to 98.9% by weight of a graft with a glass transition temperature of not more than 0° C., built up from components, the total weight of which is 100% by weight, said components being 80 to 100% by weight of at least one $C_{1-8}$alkyl(meth)acrylate, and from 0 to 20% by weight of at least one crosslinking agent which is dihydrodicyclopentadienyl acrylate and
      C3: as component C3, from 0.1 to 90% by weight of at least one other graft of styrene and acrylonitrile,
   d: as component D from 0 to 80% by weight of at least one halogen free styrene copolymer having a viscosity number of from 40 to 160,
   e: as component E, from 0 to 30% by weight of at least one rubber,
   f: as component F, from 0 to 60% by weight of at least one fibrous or particulate filler, and
   g: as component G, from 0 to 20% by weight of other additives, wherein graft copolymer C is prepared by
      (1) polymerizing styrene and dihydrodicyclopentadienyl acrylate or dihydrodicyclopentadienyl acrylate and divinylbenzene to form a core;
      (2) forming a shell on said core by copolymerizing at least one $C_1$–$C_8$-alkyl(meth)acrylate with dihydrodicyclopentadienyl acrylate in the presence of said core, and
      (3) forming an outer graft shell from monomers comprising styrene and acrylonitrile by copolymerizing said monomers in the presence of (2), and wherein the thermoplastic molding contains a blended mixture of two C copolymers, one prepared by preparing the styrene core (1) with dihydrodicyclopentadienyl acrylate and the other prepared with a combination of dihydrodicyclopentadienyl acrylate and divinylbenzene.

2. The composition of claim 1, containing about 56% of A, 0% of B and about 12% of C, the remaining percentage being based on a styrene-acrylonitrile copolymer D, glass fibers F or mixtures thereof.

3. The composition of claim 1, containing about 37 to about 39% of A, about 47 to about 50% of B and about 7 to about 10% of C, the remaining percentage being based on a styrene-acrylonitrile copolymer D, glass fibers F, a transesterification stabilizer G or mixtures thereof.

* * * * *